United States Patent [19]

Gerhardt

[11] Patent Number: 5,626,470

[45] Date of Patent: May 6, 1997

[54] METHOD FOR PROVIDING LUBRICANT TO THRUST BEARING

[75] Inventor: Don J. Gerhardt, Clemmons, N.C.

[73] Assignee: Ingersoll-Rand Company, Woodcliff Lake, N.J.

[21] Appl. No.: 631,858

[22] Filed: Apr. 10, 1996

[51] Int. Cl.$^6$ .................................................. F01C 21/04
[52] U.S. Cl. .............................. 418/84; 184/6; 184/6.16; 184/6.21; 184/6.3
[58] Field of Search ............................ 184/6, 6.11, 6.16, 184/6.21, 6.3; 418/84

[56] References Cited

U.S. PATENT DOCUMENTS

| | | |
|---|---|---|
| 1,117,504 | 11/1914 | Kingsbury . |
| 1,260,548 | 3/1918 | Kingsbury . |
| 2,507,021 | 5/1950 | Lakey . |
| 3,454,312 | 7/1969 | Bielec . |
| 3,565,498 | 2/1971 | Leopard et al. . |
| 3,814,487 | 6/1974 | Gardner . |
| 3,893,737 | 7/1975 | Tyson . |
| 3,976,165 | 8/1976 | Pilarczyk .................. 184/6.16 |
| 3,982,796 | 9/1976 | Hill . |
| 4,421,425 | 12/1983 | Foucher et al. . |
| 4,501,505 | 2/1985 | Chambers . |
| 4,983,106 | 1/1991 | Wright et al. .............. 418/84 |
| 5,007,745 | 4/1991 | Ball et al. . |
| 5,054,995 | 10/1991 | Haseley et al. . |
| 5,310,020 | 5/1994 | Martin et al. .............. 184/6.3 |
| 5,312,190 | 5/1994 | Vohr . |

FOREIGN PATENT DOCUMENTS 1675583 9/1991 U.S.S.R. ........................ 418/84

Primary Examiner—Thomas E. Denion
Attorney, Agent, or Firm—Michael M. Gnibus

[57] ABSTRACT

An apparatus for providing lubricant to thrust bearings and rotors of a rotary screw compressor. The apparatus includes a temperature sensor for sensing the temperature of the lubricant supplied to the rotors; a pressure sensor for measuring the pressure of the compressed gas discharged from the compressor; and a speed sensor for detecting the operating speed of the rotors. An electronic controller responsive to signals received from the temperature sensing means, the pressure sensing means and the speed sensing selectively opens and closes the second valve means to optimize the volume of lubricant supplied to the compressor rotors, and also controls the first valve to control the flow of lubricant to the thrust bearings. A pressure regulator controls the supply of lubricant to the thrust bearings in response to input signals received from the electronic controller. The regulator is flow connected to each thrust bearing by an independent lubricant supply line to thereby permit the pressure of one thrust bearing to be adjusted independent of the other thrust bearing.

19 Claims, 10 Drawing Sheets

METHOD FOR PROVIDING LUBRICANT TO THRUST BEARING

FIELD OF THE INVENTION

This invention generally relates to a method and system for supplying a lubricant to a thrust bearing, and more particularly to a method for supplying water to a water lubricated thrust bearing where the thrust bearing includes a unitary thrust bearing plate which has a lubricant supply side, a bearing side, at least one bearing pad along the bearing side with a lubricant distribution recess formed on each of the at least one bearing pads, at least one lubricant distribution recess on the supply side of the thrust bearing plate and lubricant flow passages flow connecting associated lubricant supply and distribution recesses.

BACKGROUND OF THE INVENTION

Hydrodynamic thrust bearings employ a wedge-shaped film of lubricant between relatively moving parts of a machine supported by the bearing to counter axial thrust loading in the machine. Fluid film lubrication occurs when there is complete separation between the parts. Typical film thickness ranges from 0.0001 to 0.005 of an inch (2.5 microns to 125 microns).

Prior art hydrodynamic bearings employ complex tilting pad or swing pad bearings to form the desired hydrodynamic wedge. Generally, such known bearings are typically comprised of a number of discrete bearing pads supported by a carrier ring. The bearing pads are supported by the carrier ring and are tiltable relative to the ring. As supported by the carrier ring, each pair of circumferentially adjacent bearing pads is separated by an opening or gap. The gaps provide a flow opening for flowing a lubricant around the pads to the pad bearing surfaces to create the desired lubricant wedge and also to provide the required clearance for pad tilting.

The carrier ring includes a number of flow openings which permit the required volume of lubricant to be flowed through the ring. The supplied lubricant flows through the carrier ring openings and gaps, around the pads and onto the pad bearing surfaces. The lubricant is not supplied directly onto the bearing pads.

In known bearings, the pads are designed to tilt to promote the development of a wedge-shaped film of lubricant between the relatively moving parts. Conventional thrust bearings which utilize the tiltable pad concept are typically complex in design and are difficult and expensive to manufacture.

Other well known thrust bearings supply a lubricant such as water for example to one side of the bearing in order to create the required lubricant film. In known thrust bearings, the lubricant is flowed through an opening such as a radially extending groove, that is located adjacent the leading edge of a bearing member or pad. The lubricant is supplied to the bearing groove and flows radially inwardly to the center of the bearing. The supplied lubricant is distributed along the bearing surface to form the desired lubricating surface. Also, since the bearing flow opening is located adjacent the leading bearing edge, the bearing is limited to rotation in a single direction.

The foregoing illustrates limitations known to exist in present devices and methods. Thus, it is apparent that it would be advantageous to provide an alternative directed at overcoming one or more of the limitations set forth above. Accordingly, a suitable alternative is provided including features more fully disclosed hereinafter.

In one aspect of the present invention this is accomplished by providing, an apparatus for supplying lubricant to thrust bearings and rotors of a rotary screw compressor. The apparatus includes a temperature sensor for sensing the temperature of the lubricant supplied to the rotors; a pressure sensor for measuring the pressure of the compressed gas discharged from the compressor; and a speed sensor for detecting the operating speed of the rotors. An electronic controller responsive to signals received from the temperature sensing means, the pressure sensing means and the speed sensing selectively opens and closes the second valve means to optimize the volume of lubricant supplied to the compressor rotors, and also controls the first valve to control the flow of lubricant to the thrust bearings. A pressure regulator controls the supply of lubricant to the thrust bearings in response to input signals received from the electronic controller. The regulator is flow connected to each thrust bearing by an independent lubricant supply line to thereby permit the pressure of one thrust bearing to be adjusted independent of the other thrust bearing.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION OF THE PREFERRED EMBODIMENTS

FIGS. 1–7b show a first embodiment of the thrust bearing of the present invention. The invention is a thrust bearing for counteracting axial thrust loads in a machine such as a fluid compressor or a pump for example. The thrust bearing uses a lubricant, such as water, to develop a film between a thrust collar plate and thrust bearing plate to thereby counteract the thrust loads. For purposes of describing the preferred embodiments of the invention, the thrust bearing will be described for use in combination with a rotary screw compressor however it should be understood that the invention could be used to counteract thrust loads in any machine.

Figure 1:
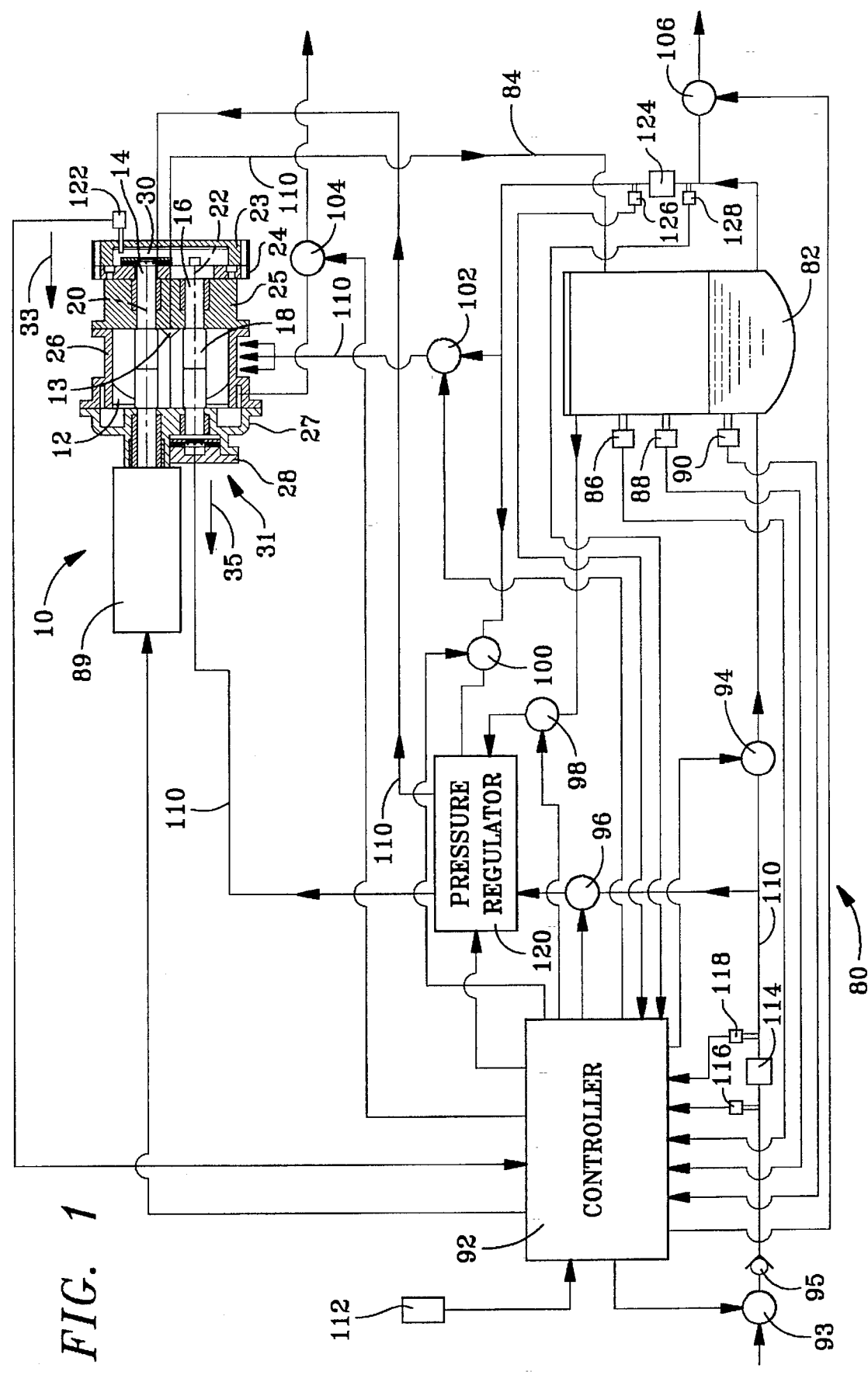
FIG. 1 is a schematic representation of both a fluid compressor that includes the thrust bearings of the present invention and also of a system for providing lubricant to the bearings.

Referring now to the drawings, wherein similar reference characters designate corresponding parts throughout the several views, FIG. 1 schematically shows a rotary screw compressor 10 having a first helical rotor 12 is fixedly located along the length of first shaft 14 A second helical rotor 18 adapted to mesh with the first rotor 12. The second rotor is fixedly located along the length of second shaft 16. The compressor 10 has an inlet (not shown) and a discharge port 13. The compressor operates in a manner that is well known to one skilled in the art and first and second rotors 12 and 18 rotate about respective longitudinal axes 20 and 22 and include helical lobes (not shown) which coact to compress a fluid such as air during operation of the compressor.

The compressor is enclosed by a housing that is comprised of the following discrete housing components: cover 23 which is attached to support plate 24, housing intermediate sections 25 and 26, second housing cover 27, and bearing support plate 28.

As shown schematically in FIG. 1, thrust bearings 30 and 31, are located respectively at the ends of first and second shafts 14 and 16. The bearings are preferably water lubricated thrust bearings and lubricating water is provided to the bearings as required by microprocessor-based supply system generally indicated in FIG. 1 at 80. The supply system will be discussed in greater detail hereinafter. For purposes of clarity, as the description proceeds, the term lubricant shall mean any suitable lubricating fluid including, but not limited to, water, oil, gas or any of the foregoing lubricants with discrete ceramic or metal beads dispersed in the lubricant.

Figure 5:
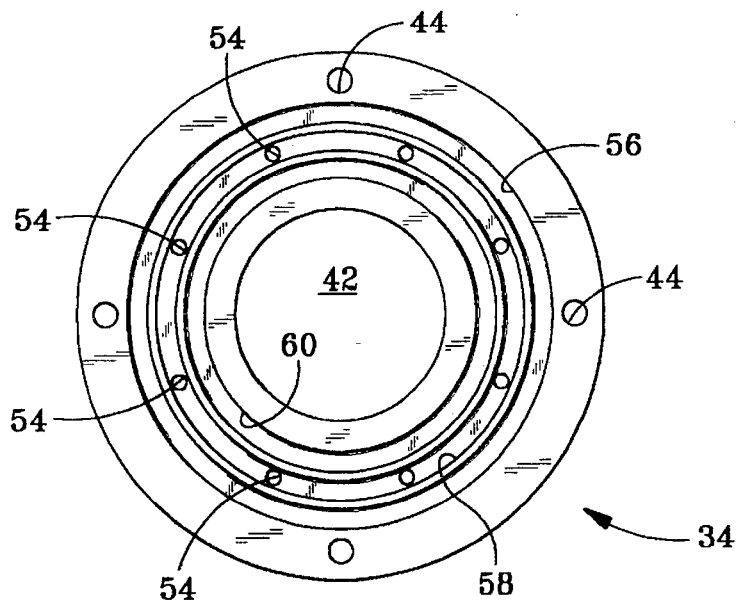
FIG. 5 is a plan view of the lubricant supply side of the bearing shown in FIG. 3.
Figure 6:
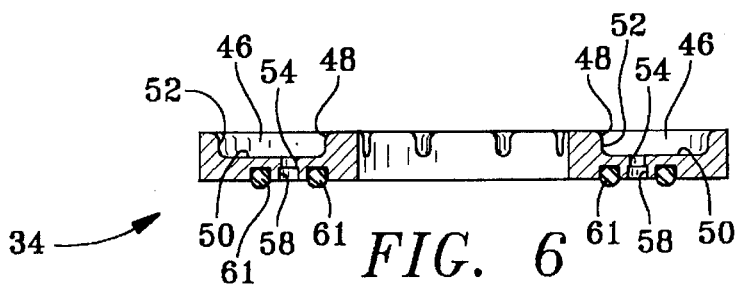
FIG. 6 is a sectional view taken along line 6—6 of FIG. 4.
Figure 7B:
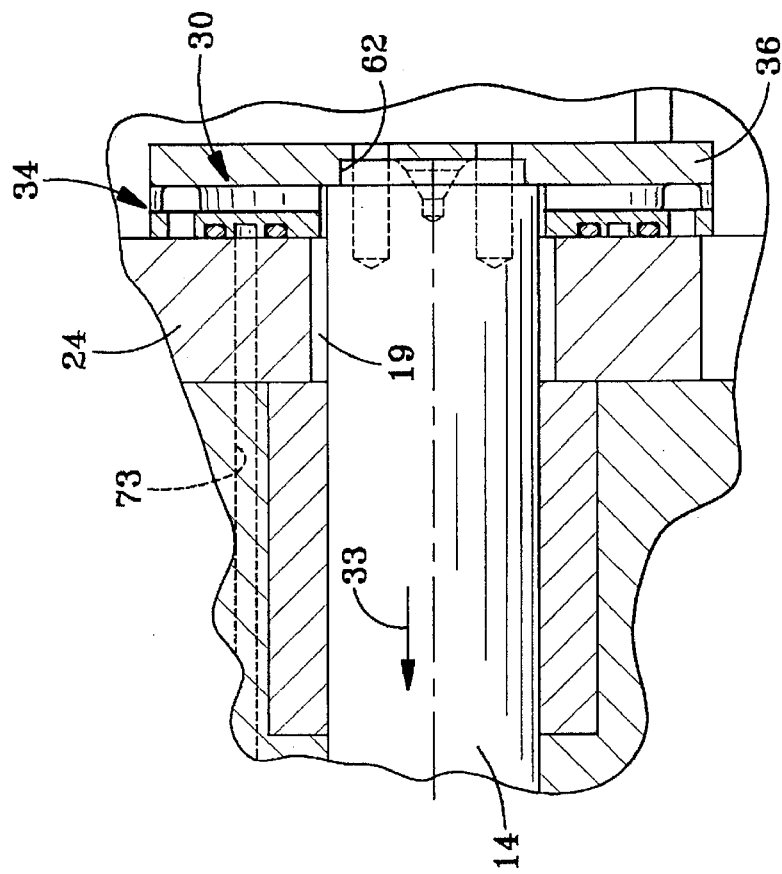
FIG. 7a and 7b are detailed views of portions of the compressor shown in FIG. 1 showing attachment between the thrust bearings and the compressor housing.
Figure 7A:
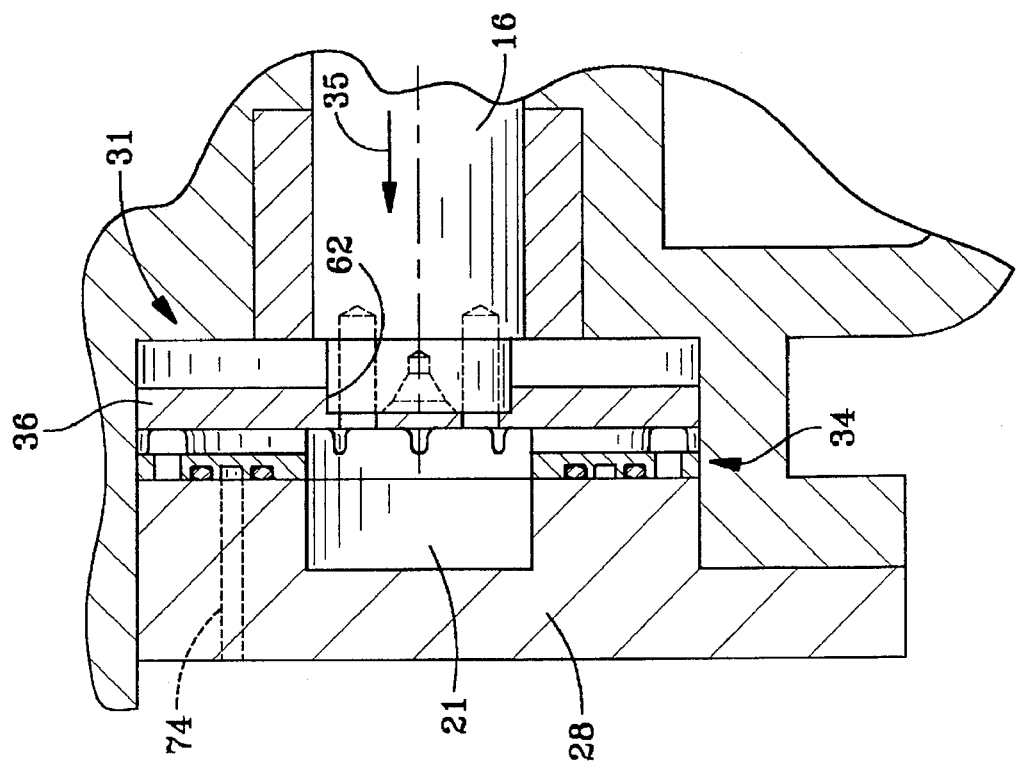

The first embodiment bearings 30 and 31 include a fixed thrust bearing plate 34 as shown in FIGS. 2–7b, and a movable thrust collar plate 36 shown in FIGS. 7a and 7b. First embodiment thrust bearing 31 includes a thrust collar plate 36 mounted at the end of second shaft 16 to be rotatable with the shaft, and a thrust bearing plate mounted along the length of the second shaft, closely adjacent the thrust collar, between the thrust collar and the second helical rotor 18. The thrust bearing plate 34 of bearing 31 is fixed to housing support plate 28. See FIG. 7a.

As shown in FIGS. 7a and 7b, first embodiment thrust bearing 30 includes a thrust collar plate 36 mounted to the end of first shaft 14 to be rotatable with the shaft 14. A thrust bearing plate 34 is located along shaft 14 between plate 36 and rotor 12, is closely adjacent the thrust collar plate 36. The thrust bearing plate 34 is fixed to plate 24 of the compressor housing.

Each thrust bearing plate 34 is fixed to the compressor housing by bolts or other conventional fasteners. Additionally, lubricant supply chambers 19 and 21 are provided adjacent a lubricant supply side of each bearing in order to provide a means for supplying the lubricant to the bearings 30 and 31.

The discharge pressure of the mixture of compressed gas and lubricant tends to force the rotors in the direction indicated by arrows 33 and 35, therefore, the bearings 30 and 31 are adapted to counteract thrust loading in the directions 33 and 35 respectively. Lubricant, such as water, is supplied to the bearings, 30 and 31, flows through openings in the bearings and against the respective thrust collar, thereby forming a thin lubricating film between the collar and plate thereby effectively counteracting the thrust forces produced during compressor operation.

Figure 7C:
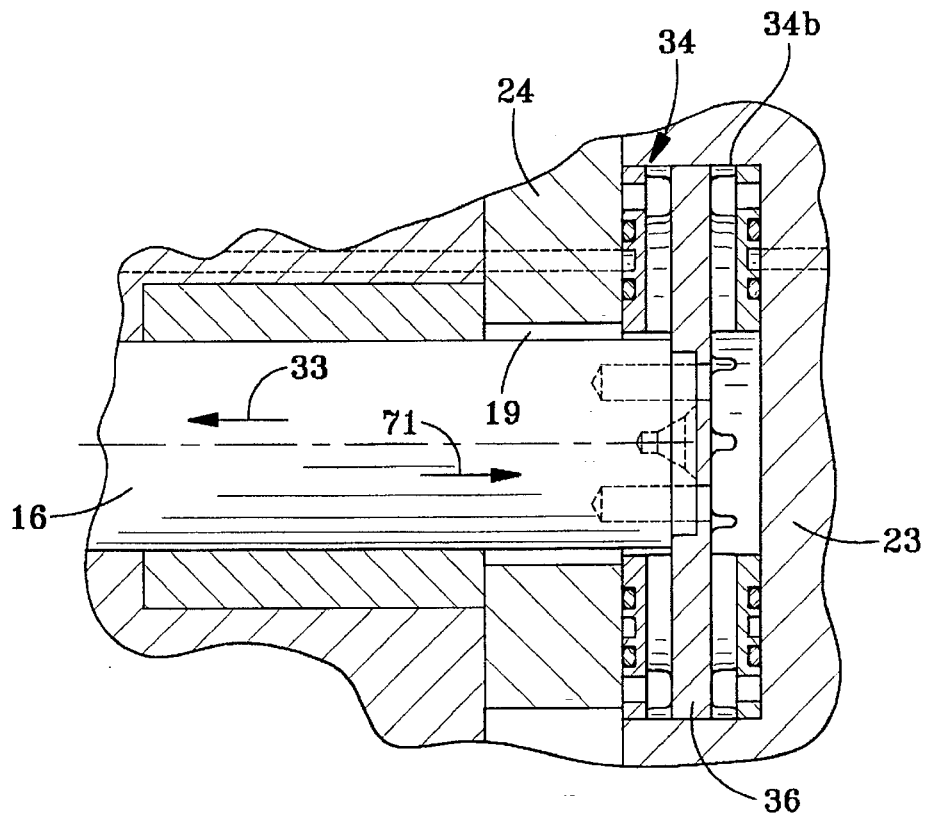
FIG. 7c is an alternate embodiment of the detailed view shown in FIG. 7b, showing thrust bearing plates on both sides of the thrust collar.

It is contemplated that the thrust bearings may include thrust bearing plates on both sides of the thrust collar plate 36 as shown in FIG. 7c. In this way, the thrust bearings 30 and 31 would be adapted to counteract thrust loads in directions 33 and 35 as well as axial thrust loading in the directions opposite directions 33 and 35. In such an alternate embodiment, the thrust plate 34b would be fixed to the housing 180 degrees opposite from plate 34. Bearing plate 34b is otherwise identical to thrust bearing plate 34. In such an alternate embodiment, both thrust bearing plates are fixed to the compressor housing and the thrust collar plate sandwiched therebetween is mounted along the length of the respective shaft for movement with the shaft. In use, a lubricant would be supplied to the supply side of both thrust bearing plates to counteract axial loads in axial direction 71, opposite directions 33 and 35.

The thrust bearing plate 34 is unitary and is preferably made from a polymer-based material however the bearing plate may be made from any suitable material including, but not limited to, a ceramic material or a metal.

First embodiment thrust bearings 30 and 31 are substantially similar, so that as the description proceeds, only bearing 30 will be described. However, the disclosure will also include a description of features unique to thrust bearing 31, as required.

Figure 2:
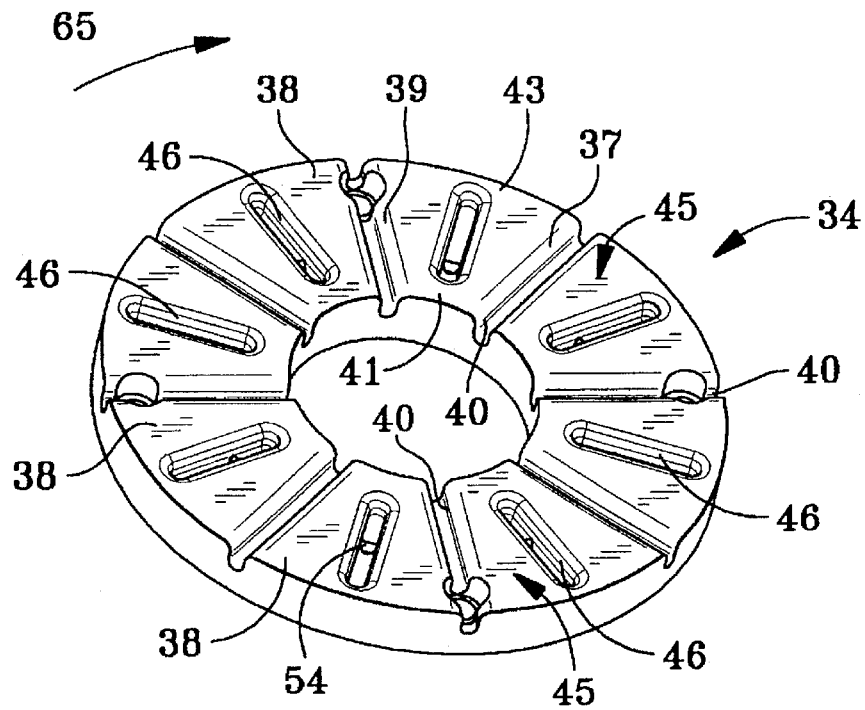
FIG. 2 is a perspective view of a first embodiment thrust bearing plate showing the bearing side of the plate.
Figure 3:
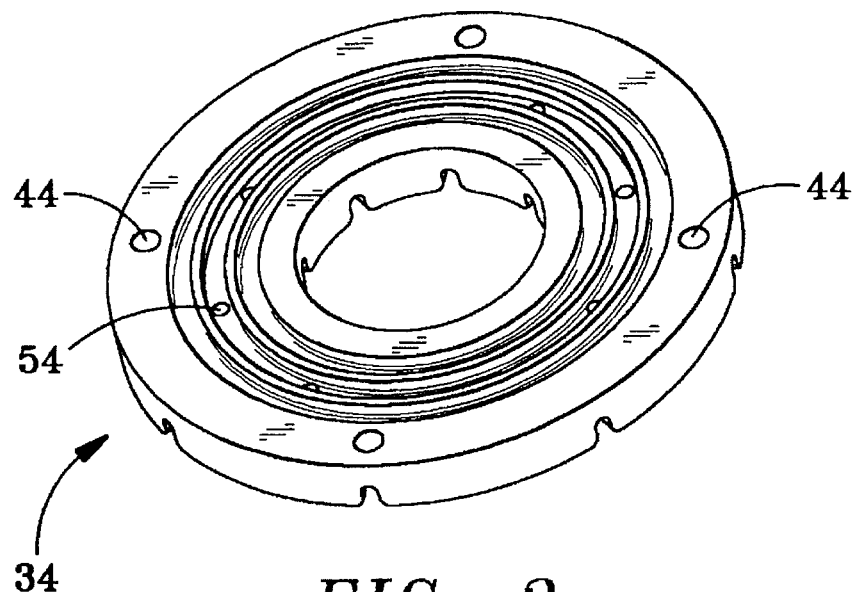
FIG. 3 is a perspective view of the first embodiment thrust bearing plate showing the lubricant supply side of the bearing plate.
Figure 4:
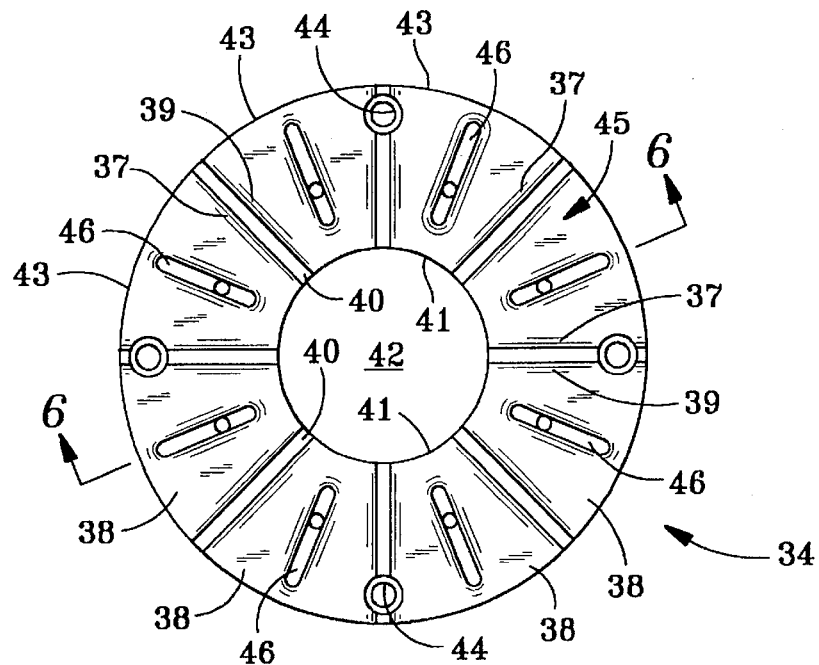
FIG. 4 is a plan view of the bearing side of the bearing plate shown in FIG. 2.

FIGS. 1–7b show a first embodiment thrust bearing plate for thrust bearing 30 and FIGS. 2–6 show the thrust bearing plate in detail. As shown in FIGS. 2 and 4 which disclose a bearing side, the thrust bearing plate includes a plurality of bearing pads 38 arranged in an annular array along the bearing side. As shown in FIG. 7a, the bearing pads are located closely adjacent one face of thrust collar plate 36 when the thrust bearing plate 34 and collar plate 36 are located in the compressor housing. For purposes of disclosing the first preferred embodiment, bearing plate 34 includes eight bearing pads. The bearing plate must include at least one bearing pad and may include any number of pads required to effectively counteract thrust loading in a particular machine. It is contemplated that the plate 34 may include more than one hundred pads.

Each bearing pad is substantially wedge-shaped and includes a bearing surface that is defined radially by first and second radial edges 37 and 39 and along the inner and outer periphery by peripheral edges 41 and 43. As shown in FIG. 2, the radial edges are rounded to aid in the development of the thin lubrication film and thereby increase the efficiency of the bearing.

A lubricant distribution means 46 is provided in each pad 38 in order to supply lubricant directly onto the bearing pad surface. The lubricant distribution means extends radially along the pad and is located circumferentially, approximately halfway between the radial edges 37 and 39. As shown in FIG. 4 and 6, the distibution means 46 is substantially oval and includes a mouth 48 formed along the bearing surface 45 of the pad. Each groove 46 includes a bottom 50. The mouth and bottom of the grooves 46 are joined by inwardly tapered walls 52. Lubricant flow passages 54 extend laterally, through the thrust bearing plate and form openings on floor 50. A lubricant, such as water, is flowed from through the passages into the distribution groove and onto the respective pad bearing surface. The flow passage openings are located radially inwardly from the center of each groove. See FIG. 4.

Bearing plate 34 includes a central bore 42 that is adapted to slidably receive first shaft 14.

Each pad is separated from each adjacent pad by a radially extending channel 40. As shown in FIGS. 2 and 4, the channels flow connect the central bore 42 and outer periphery of the bearing plate. The channels extend substantially through the body of the bearing plate. The channels may extend through 90% or more of the thickness of the bearing plate. For example, if the bearing is 10 millimeters thick 0.393 inches, the channel may have a depth of 9 millimeters (0.354 inches) and in this way would extend through 90% of the thickness of the bearing plate. The channels serve to isolate each of the bearing pads from the other bearing pads so that each of the pads is able to coact with the thrust collar plate 36 independent of the other pads, and produce and maintain the required lubricant film. The independent, isolated displacement of each pad accommodates run out that may be present in the thrust collar plate and permits the thrust bearing plate to maintain the required lubricating film thickness between the pads and the thrust collar plate.

Counter bores 44 are formed in a number of the channels near the outer periphery of the bearing plate. As shown in FIG. 4, the bearing plate includes four counter bores, each spaced from the next adjacent counter bore by ninety degrees. Each counter bore has a wide portion that extends through the channel and a relatively narrow portion that extends through the supply side of the bearing plate. See FIG. 5. The counter bores are adapted to receive a bolt or other conventional fastener member so that the plate 34 can be attached to the compressor housing. The head of the connection member is located in the wide portion of the counter bore and the body of the connecting member is inserted in the narrow portion.

Three annular grooves 56, 58, and 60 are formed along a lubricant supply side of bearing plate 34 as shown in FIGS. 3, 5 and 6. As shown in FIG. 5, the grooves are located between the counter bore openings 44 and the central bore 42. Outer groove 56 and inner groove 60 are adapted to receive an o-ring type seal 61 as shown in FIG. 6. The lubrication flow passages 54 flow connect the middle groove 58 with distribution grooves 46. Lubricant is supplied to middle groove and is flowed through the flow passages to the distribution grooves. The o-rings serve to seal the middle groove 58 so that lubricant may be effectively supplied to the distribution grooves 46.

As shown most clearly in FIGS. 7b, the o-rings are sandwiched between the bearing plate the adjacent portion of the compressor housing. The o-rings provide flexibility and resiliency to the bearing plate. The o-ring seals permit the bearing plate to re-orient itself during operation in response to run out or other dimensional inaccuracies in the thrust collar plate and in this way maintain the lubricant film. If the thrust collar plate includes inaccuracies such as run out, the o-rings permit the bearing plate to alter its mounting angle, relative to the thrust collar plate, with each rotation of thrust plate 36 so that during operation the bearing plate mounting angle may be altered from a normal operating orientation, substantially parallel to the thrust collar plate, as required.

Lubricant is supplied to the groove 58 directly through passages 73 and 74 formed in the compressor housing.

Thrust collar plate 36 is disk shaped and includes a recess 62 that extends laterally, substantially through the plate and is adapted to receive an end of shafts 14 and 16. See FIG. 7b. The thrust collar plate also includes a plurality of openings formed in the recess. The openings are adapted to receive connection members for attaching the thrust collar plate to the end of the respective shaft. The thickness of the thrust collar plate may be decreased relative to the bearing plate and in this way the flexibility of the thrust collar plate may be increased in order to produce the required lubrication film. The deflection of the thrust collar plate may be as much as 0.002 of an inch (50 microns).

The lubricant supply system 80 will now be described. Rotary screw compressor 10 compresses air that enters the compressor through the compressor inlet and discharges a mixture of compressed air and lubricant through the compressor discharge port 13 and the mixture is flowed to separator 82. Main discharge conduit 84 flow connects the compressor discharge outlet and the inlet of the separator. The separator may be a separator tank or separator tube and serves to separate the compressed air and lubricant in a manner generally known to one skilled in the art, and to collect the lubricant in the lower sump portion of the separator. The separator includes a sump discharge port that is flow connected to pressure regulator 120. The separator includes pressure sensor 86, high lubricant level detection means 88 and low lubricant level detection means 90. Each detection means and sensor 86 are in signal transmitting relation with electronic controller means 92 as shown in FIG. 1. The electronic controller means will be discussed in detail hereinafter.

The system 80 includes a main valve 93 which is opened and closed by controller 92 to thereby open and close the main supply lubricant supply line 110.

System 80 includes first, second, third, fourth fifth, sixth, and seventh valve means 94, 96, 98, 100, 102, 104, and 106 respectively. Each valve means opens and closes a particular branch of the system lubricant flow line shown in bold font and generally referred to at 110. Additionally, each valve means is in signal receiving relation with the electronic control means 92 which opens and closes the valves. The valves may be any conventional valve well known to one skilled in the art. Operation of the valve means will be described in further detail during the detailed description of the operation of the system hereinafter.

Ambient temperature measuring means 112 measures the ambient temperature during operation of compressor 10 and after the compressor is shut down. The temperature sensing means is electrically connected to controller 92 and is in signal transmitting relation relative to the controller.

Filter 114 is located in fluid flow line 110 upstream from first valve means 94 as shown in FIG. 1. First lubricant pressure sensing means 116 is connected to the supply line at a location upstream from filter 114 and second lubricant pressure sensing means 118 is located in the supply line at a location downstream from the filter 114. The controller 92 is electrically connected to the sensors 116 and 118 and is signal receiving relation with the sensors. The system controller 92 compares the upstream lubricant pressure measured by sensor 116 and the downstream pressure measured by sensor 118 and if the difference between the two pressure readings is at or above a predetermined threshhold value, the filter element needs to be replaced and the compressor operator is alerted that such service is required.

Pressure regulator 120 is located in lubricant flow line 110 downstream from valve means 96, 98, and 100 and serves to regulate the volume of lubricant supplied to the bearings 30 and 31 and rotors 12 and 18. The pressure regulator is in signal receiving relation with the controller 92. As shown in FIG. 1, branches of lubricant flow line 110 are dedicated to supplying lubricant to a respective bearing. In this way, the operating pressure at each bearing can be adjusted by the pressure regulator in response to inputs received from the controller.

A rotor speed sensing means 122 is located adjacent the thrust collar plate 36 of thrust bearing 30. It is preferred that the sensor be located adjacent the bearing thrust plate for the bearing located on the end shaft of the rotor that is driven directly by the prime mover. Therefore, the sensor is located adjacent bearing 30 since rotor 12 is directly driven by prime mover 89 which may be an electric motor for example. The speed sensing means is connected in signal transmitting relation with controller 92.

The system includes a cooler 124 located upstream from valve means 100, in the branch of flow line 110 that receives lubricant captured in the bottom of separator 82. See FIG. 1. The cooler 124 cools the relatively warm lubricant to a predetermined desired temperature. A first temperature sensing means is located in the flow line upstream from the cooler 124 and a second temperature sensing means is located in the flow line downstream from the cooler. Both sensing means 126 and 128 measure the temperature of the lubricant that is to be supplied to compressor 10 in order to make sure the lubricant is at the required temperature. The sensors are in signal transmitting relationship with controller 92.

In the system 80, the electronic control means is a microprocessor based controller such as that disclosed in U.S. Pat. No. 5,054,995 which is incorporated herein by specific reference. The controller is in signal transmitting relation with the seven valve means and opens and closes the valve means as required before starting the compressor, while the compressor is running and after the compressor has been shut down. The controller receives and processes signals from the various system sensing means 86, 88, 90, 112, 116, 118, 122, 126, and 128 and, based on the signals received from the system sensing means, opens and closes the required valves means. The controller is electrically connected to the prime mover 89 which may be an electric motor. During compressor startup, the electric motor is started gradually. The controller provides intermittent power to the motor to provide slow startup to permit the proper lubrication film to build up in the bearings.

The controller may also control a lubricant pump (not shown) during compressor startup and shutdown. In this way, the pump can deliver the required supply of lubricant to the compressor.

Operation of the system 80, compressor 10 and thrust bearings will now be described. Prior to start up of the compressor 10, second valve means 96 is opened by controller 92 and lubricant is supplied to thrust bearings 30 and 31 through the respective branch of the flow line 110. The compressor may include radial bearings which would also be flooded with lubricant by the system before start up of compressor 10. If the compressor included such radial bearings, a single flow line could be used to supply the lubricant to the radial bearings. Additionally, the lubricant pressure regulator can be set to provide unique pressures to each of the bearings 30 and 31. A check valve (not shown) may be included in the flow line upstream from second valve means 96 to prevent any reverse flow of lubricant or compressed air back into the main lubricant supply.

If thrust bearing plates are provided on both sides of the thrust collar plate, as shown in FIG. 7c, the system would include four separate branches, one for each thrust plate, rather than the two branches as disclosed.

As the lubricant is supplied to the bearings, the lubricant is introduced at the supply side of the bearing plate 34, is flowed through the passages 73 and 74, supply grooves 58, shown in FIGS. 5 and 6, flow passages 54, and distribution recesses 46 and onto the pad bearing surfaces to produce a lubricant film on the pad surface which separates the bearing plate 34 from the thrust collar plate 36. In this way, the rotors are loaded by the thrust bearings to counteract axial thrust loads. Additionally, the lubricant film acting against the thrust collar may displace the rotors along the longitudinal axes 20 and 22 and thereby control rotor backlash and reduce rotor rumble and noise. Lubricant is also supplied to the bearing at central bore 42 and flows radially outwardly through channels 40. The lubricant can be supplied at different flow pressures to the central bore and the supply recesses.

During flooding, any excess lubricant flowed to the bearings is drawn by gravity to the bottom of the compressor housing. In this way, the excess lubricant does not collect in the compressor housing and clog the rotors. The sixth valve means 104 is opened by the controller and the collected lubricant is drained from the housing. The lubricant may then be reinjected to the compressor rotors, collected in a storage receptacle, or sent to an external drain.

After the bearings have been sufficiently flooded with lubricant, the compressor is started. During operation of the compressor, the thrust collar plate rotates with the respective shaft and thrust bearing plate remains stationary, fixed to the compressor housing. Arrow 65 shown in FIG. 2 represents the direction of rotation of thrust collar plate 36, making radial edge 39 the leading edge and radial edge 37 the trailing edge of each bearing pad. During operation of the compressor, lubricant is injected to the compressor by opening fifth valve means 102. The controller 92 optimizes the lubricant injection flow to the compressor based on rotor speed as measured by rotor sensor 122, air pressure as measured by sensor 86, lubricant temperature as measured by sensors 126 and 128, and ambient temperature sensor 112.

Lubricant may be supplied directly to the rotors 12 and 18 by opening fifth valve means 102.

As the lubricant flows from the supply side of the bearing to the bearing side to contribute to the film on the bearing surface, the thrust collar rotates passed the lubricant and draws or distributes the lubricant along the pad bearing surfaces. The drawn lubricant is forced radially outwardly from between the thrust collar plate and thrust bearing plate by centrifugal effects and used lubricant is gravity fed to the bottom of the compressor housing where it is collected as previously described. The collected lubricant may be reflowed to the airend or collected as discussed above. The lubricating film is maintained by continually flowing lubricant to the bearing pads in the manner previously described.

The volume of lubricant injected to the bearings and rotors is optimized based on a number of factors including, but not limited to, operating time, ambient conditions, and the demand for compressed air. In this way, the volume of lubricant that is supplied can be changed to compensate for wear in the bearings.

A mixture of compressed air and lubricant is flowed through compressor discharge port 13, through main discharge conduit 84 and into separator 82 which separates the compressed air from the lubricant which is collected in the bottom of the separator.

When the pressure of the compressed air as sensed by sensor 86, exceeds the pressure of the supply pressure of the lubricant as measured by sensor 116, the controller opens fourth valve means 100 to permit lubricant collected in the bottom of the separator to flow out the discharge outlet of separator 82, to the thrust bearings 30 and 31. Second valve means 96 is closed while fourth valve means is opened. When the main supply pressure returns to an acceptable predetermined level, valve means 100 is closed and valve means 96 is again opened.

Electronic controller 92 maintains the desired level of lubricant in separator tank 82. First valve means 94 is opened if lubricant level sensor 90 measures a level that is below a predetermined desired level. Lubricant is supplied to the tank until the lubricant is at the required level and then controller 92 closes first valve means 94.

Conversely, if the maximum level sensor 88, senses that the lubricant level in the tank exceeds a predetermined maximum level, the controller 92 opens seventh valve means 106 and permits lubricant to be flowed outward from the tank 82 to a conventional storage tank or drain (not shown). Seventh valve means 106 is closed when the lubricant level has receded to the desired level.

The controller 92 contols operation of the cooler which may be a fan for example, in order to maintain optimum temperature of the lubricant. The cooler is turned on and off as required based on lubricant temperature readings by sensors 126 and 128.

During compressor shutdown, second valve means 96 is opened to supply lubricant to bearings 30 and 31 when the pressure of tank 82 falls below the main supply pressure. Fourth valve means 100 is closed when second valve means 96 is opened. Lubricant is drawn by gravity and collects at the bottom of the compressor housing and is drained as described hereinabove.

After the rotors have stopped rotating, as sensed by sensor 122, the controller closes valves 94, 96, 100, 102, and 106; and opens third valve means 98. When valve 98 is opened, compressed air trapped in the separator 82 is flowed therefrom, through the compressor and serves to blow all lubricant trapped in the compressor to the bottom of the compressor housing where it remains until it is drained through valve 104. If the lubricant is water, this operational step prevents damage to the bearings due to water freezing or corrosion.

If sensor 112 measures an ambient temperature approaches 32° F. and the compressor is not running, the controller will open valve 104 and drain the lubricant collected in the bottom of the housing. In this way, the lubricant will not damage the compressor or bearings.

In the event that there is a loss of electrical power to system 80, valves 94 and 96 are opened and the pressurized lubricant accumulated in the separator is flowed to the bearings 30 and 31. Valve 104 remains open so that excess lubricant can drain from the compressor housing. The lubricant is supplied to the bearings until the rotors stop rotating typically a period of five seconds.

The controller can cause the system to flush the compressor to flush contaminants from the system and provide new lubricant.

Detailed descriptions of the second through ninth preferred embodiments of the thrust bearing invention will be described hereinbelow. For purposes of clarity, in each of the follolwing alternate embodiments of the thrust bearing and particularly, the thrust bearing plate, elements of the alternate embodiment thrust bearing plates which are the same as the elements disclosed in the description of the first preferred embodiment bearing plate shall be referred to using the reference characters assigned in the discussion of the first preferred embodiment, hereinabove. Also, it should be understood that each of the following alternate embodiment thrust bearing plates is mounted on a rotor end shaft, is fixed to the compressor housing, and is adapted to be used in combination with rotatable thrust collar plate 36 and system 80 in the manner previously described.

Figure 8:
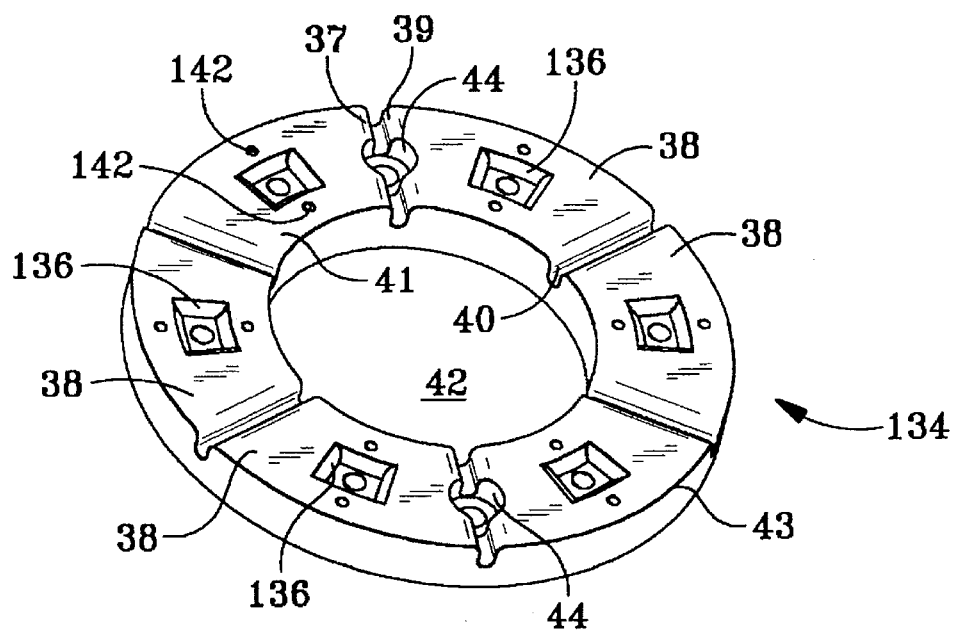
FIG. 8 is a perspective view of a second embodiment thrust bearing plate, showing the bearing side of the plate.
Figure 9:
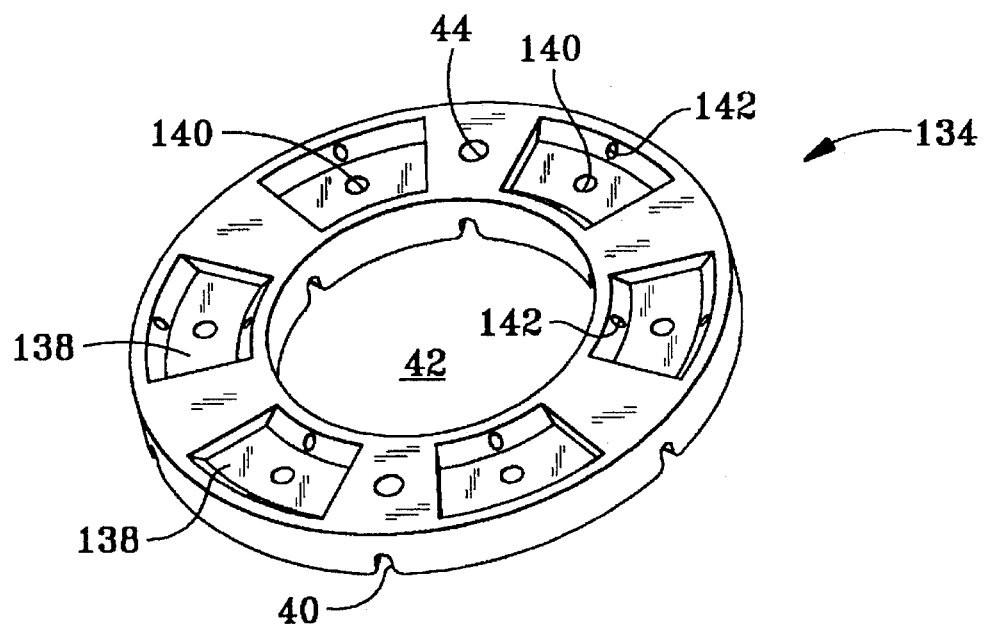
FIG. 9 is a perspective view of the second embodiment thrust bearing plate showing the lubricant supply side of the plate.
Figure 10:
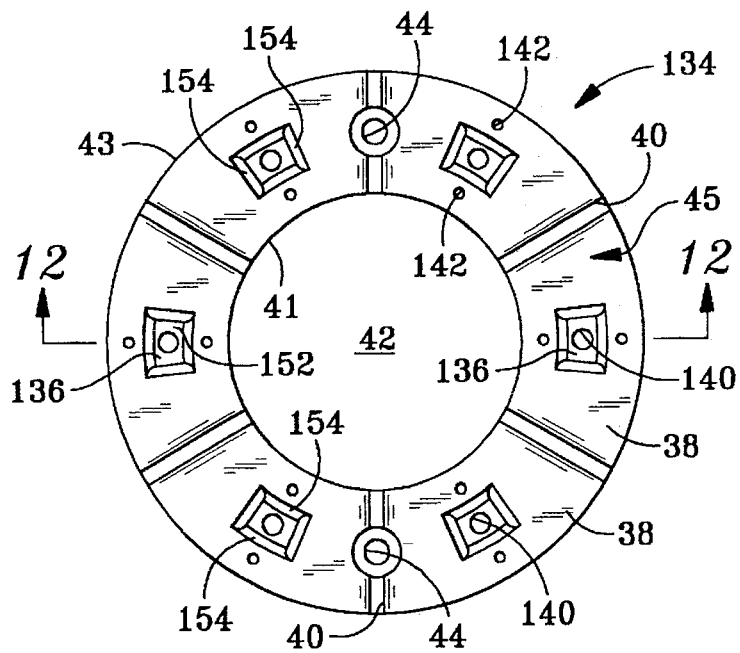
FIG. 10 is a plan view of the bearing side shown in FIG. 8.

FIGS. 8–12 show a thrust bearing plate 134 for a second embodiment thrust bearing. Plate 134 is similar to first embodiment thrust bearing plate 34. Like thrust bearing plate 34, plate 134 is disk-shaped includes a central bore 42, and a plurality of substantially wedge-shaped bearing pads 38 that include a bearing surface defined by radially extending edges 37 and 39 and peripheral edges 41 and 43. Each pad is separated from each adjacent pad by channels 40 and can coact with the thrust collar plate 36 independently of the other thrust pads as previously described. Additionally, bearing plate 134 includes two counterbore recesses 44 which are offset by 180 degrees as shown in FIGS. 8 and 10.

Figure 11:
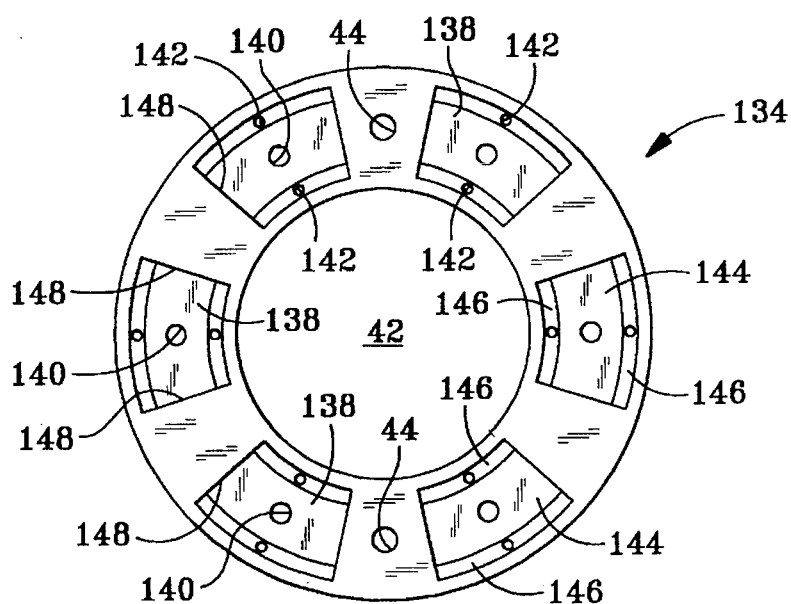
FIG. 11 is a plan view of the lubricant supply side shown in FIG. 9.
Figure 12:
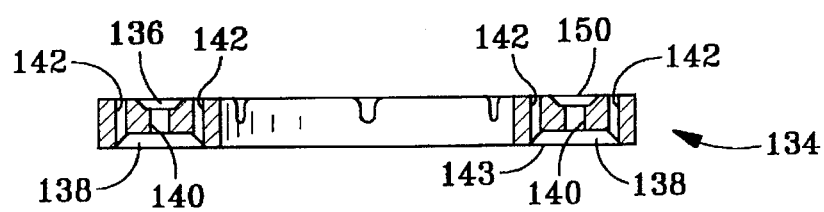
FIG. 12 is a sectional view taken along line 12—12 of FIG. 10.

Bearing plate 134 also includes a plurality of discrete lubricant supply recesses 138 along the supply side of the of the bearing plate as shown in FIGS. 9 and 11, distribution recesses 136 along the bearing side of the bearing plate, and flow passages 140, flow connecting each pair of associated distribution and supply recesses. Lubricant is supplied to each supply recess through a respective passage like passage 73 and 74. As shown in FIG. 12, each supply recess 138 is adjacent and parallel to a respective distribution recess 136.

As shown in FIGS. 10 and 11, the distribution and supply recesses are substantially rectangular. The supply recesses 138 include mouth 143, floor 144, inwardly tapered longitudinal walls 146 and lateral walls 148. In addition to enhancing the supply of lubricant to the bearing surfaces, the supply recesses 138 also contribute to the flexibility of the individual bearing pads. This added pad flexibility permits each pad to deflect during operation to maintain the lubricating film between the bearing pads and thrust collar plate. Such pad deflection is relatively small and may be 0.002 of an inch for example. The supply recesses 138 in combination with channels 40 provide the requisite pad flexibility to permit the pads to independently adjust to run out or other inaccuracies in the thrust collar plate and thereby maintain the desired lubrication film.

Distribution recesses 136 include a mouth 150, floor 152, and inwardly tapered sidewalls 154 extending joining the mouth and floor. The distribution and supply recesses are located approximately half the circumferential distance between the radial edges 37 and 39.

As shown in FIG. 12, the lubricant flow passages extend through the floors of the recesses 136 and 138.

Lubricant drain passages 142 extend laterally, through pads 38 and longitudinal walls 146 of supply recesses 138. See FIGS. 10, 11, and 12. The drain passages provide a means for lubricant trapped in the bearing to escape therefrom when the compressed air is flowed through the bearing after compressor shutdown. It is contemplated that the lubricant drain passages may extend through the pads and longitudinal walls 146 of recesses 138 at any location along the pad. The drain passages may extend through the walls 146 at any suitable location including any one or more of the corners where the longitudinal and lateral walls are joined.

The bearing operates in the manner previously described.

Figure 13:
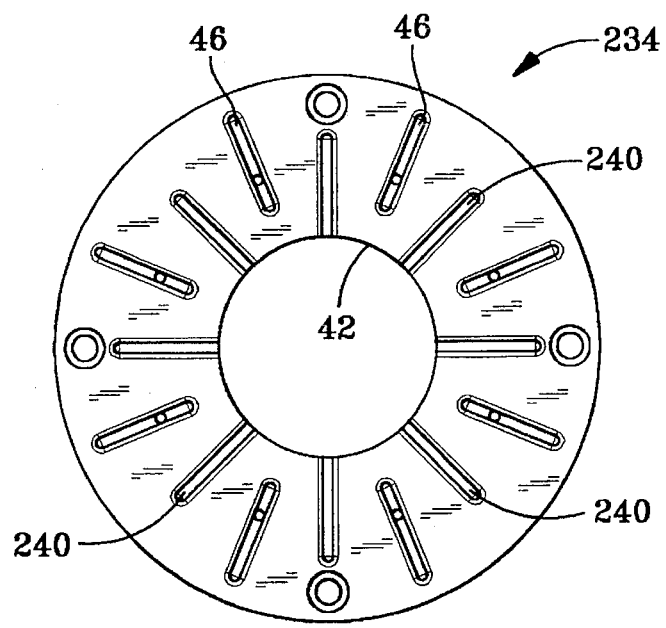
FIG. 13 is a plan view of the bearing side of a third embodiment thrust bearing plate.

A third embodiment thrust bearing plate is shown in FIG. 13. The third embodiment thrust bearing plate 234 is identical to first embodiment thrust bearing plate 34 except that the channels 40 of the first embodiment thrust bearing plate 34 do not extend completely between the central bore 42 and outer periphery but rather channels 240 are closed at one end. As shown in FIG. 13, the channels 240 are closed at the end located adjacent the outer periphery of the thrust bearing plate. By closing one end of channel 240, additional lubricant may be supplied to the center of the thrust bearing plate 234. During operation of the compressor, the lubricant which is supplied at the center of the bearing thrust plate is flowed radially outwardly through channels 240 and upon reaching the restricted end, will be drawn out of the channel by the rotating thrust collar and onto the bearing surfaces of pads 38 and thereby contribute to the required lubricat film between the thrust collar plate and thrust bearing plate.

The channel 240 may be formed during manufacture of bearing plate 234 by forming a closed end as in channel 240 or by significantly tapering the channel from a wide portion at central bore 42 to an extremely narrow portion proximate the outer periphery of the plate 234. Alternatively, the end of a channel like channel 40 may be restricted by locating an obstructing member such as a bolt, resilient member or a resilient member with an orifice, at the end of the channel located adjacent the outer periphery and effectively impedeing the radial outward flow of the lubricant.

In the following disclosures of the fourth–ninth embodiments of the invention only a portion of the thrust bearing plate is provided in the associated FIGS. 14–19. In each FIG., the bearing side of a single pad 38 is shown and a lubrication distribution means is provided on the representative bearing pad. Each pad on the following thrust bearing plates is provided with the same distribution means as disclosed in the representative bearing pad.

Figure 14:
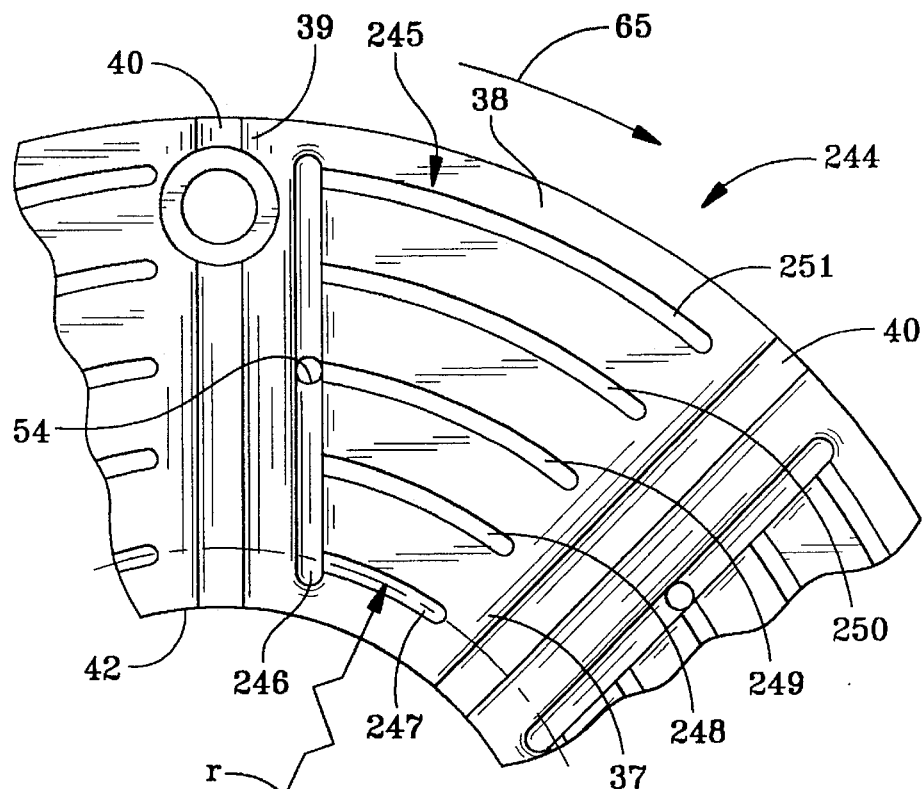
FIG. 14 is an enlarged view of a portion of the bearing side a fourth embodiment thrust bearing plate showing a bearing pad and lubricant distribution recess.

FIG. 14 discloses a fourth preferred embodiment of the thrust bearing plate of the present invention. The thrust bearing plate 244 includes distribution means 245 that is is comprised of an oval groove 246 and a plurality of arcuate flow branches 247, 248, 249, 250, and 251. For purposes of describing the fourth preferred embodiment of the invention, five distribution branches are shown however it should be understood that any suitable number of branches may be provided. The groove 246 is like groove 46 and the groove extends radially substantially parallel to first radial edge 39. The groove may also be located adjacent second radial edge 37.

The branches 247–251 are arcuate and the branches increase in median radius, designated "r" in FIG. 14 and in arc length the closer the branches are located to the outer periphery of the bearing plate 244. Branch 251 has the greatest median radius and arclength and branch 247 has the smallest median radius and arclength. The branches are in fluid receiving communication with groove 246 so that lubricant supplied to the groove may be distributed to the branches and contribute to the film formed on the bearing pad. The branches and groove 246 are recessed in the pad approximately half the width of the pad 38.

Lubricant flow passage 54 extends through the bearing plate to provide lubricant to the groove 246.

The annular groove 58 of the first preferred embodiment or recess 138 of the second preferred embodiment may be provided on the supply side of the bearing.

Using the thrust collar plate rotation direction provided by arrow 65, as the collar plate 36 rotates, lubricant supplied to groove 246 through recess 58 and passage 54 flows through the groove and branches and is transferred by the motion of the thrust collar through the grooves and along the pad to thereby form the necessary lubricant film.

Figure 15:
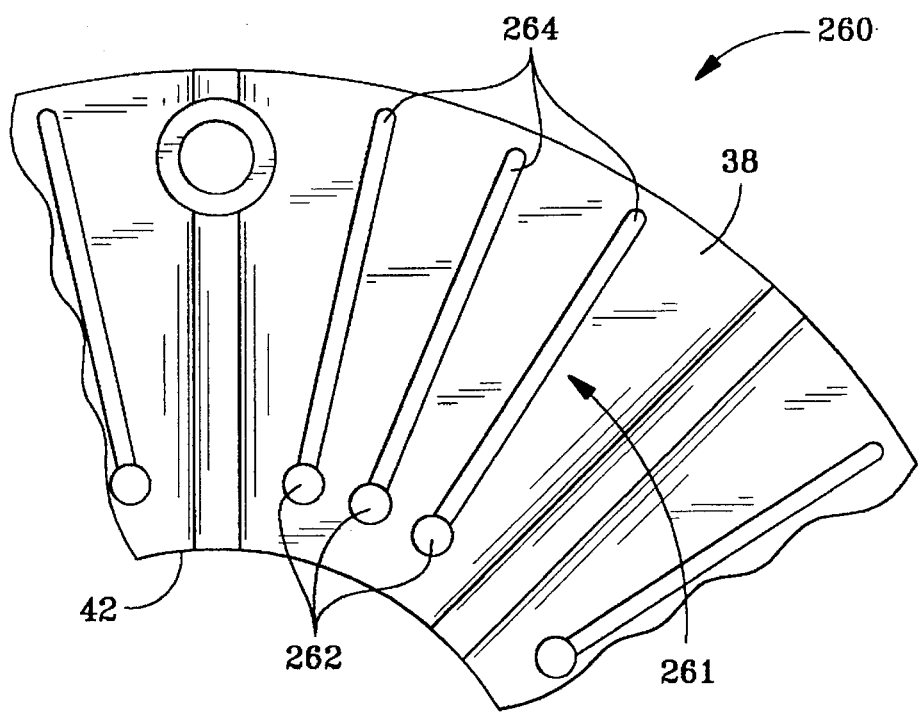
FIG. 15 is an enlarged view of a portion of the bearing side of a fifth embodiment thrust bearing plate showing a bearing pad and lubricant distribution recess.

FIG. 15 discloses a fifth preferred embodiment of the thrust bearing plate of the present invention. Thrust bearing plate 260 includes a distribution means 261 formed along pad 38. The distribution means is comprised of lubrication distribution passages 262 that extend through the pad, and radially extending grooves 264 where each groove is in lubricant receiving relationship with a passage 262. The distribution passages are located proximate central bore 42 and the grooves extend radially away from the central bore to a position proximate the outer periphery of the thrust bearing plate. The grooves are closed at the groove end adjacent the outer periphery. Each groove 264 and passageway 262 forms a groove/passageway combination.

Any number of passage/groove combinations may be provided on each bearing pad, however for purposes of disclosing the fifth preferred embodiment, three such combinations are formed on the pad.

The passages extend through the thrust bearing plate and the grooves are recesseed below the bearing surface approximately half the thickness of the thrust bearing plate.

Recess 138 is formed along the supply side of the bearing plate. The passages 262 flow connect the supply and bearing sides of the bearing plate.

Figure 16:
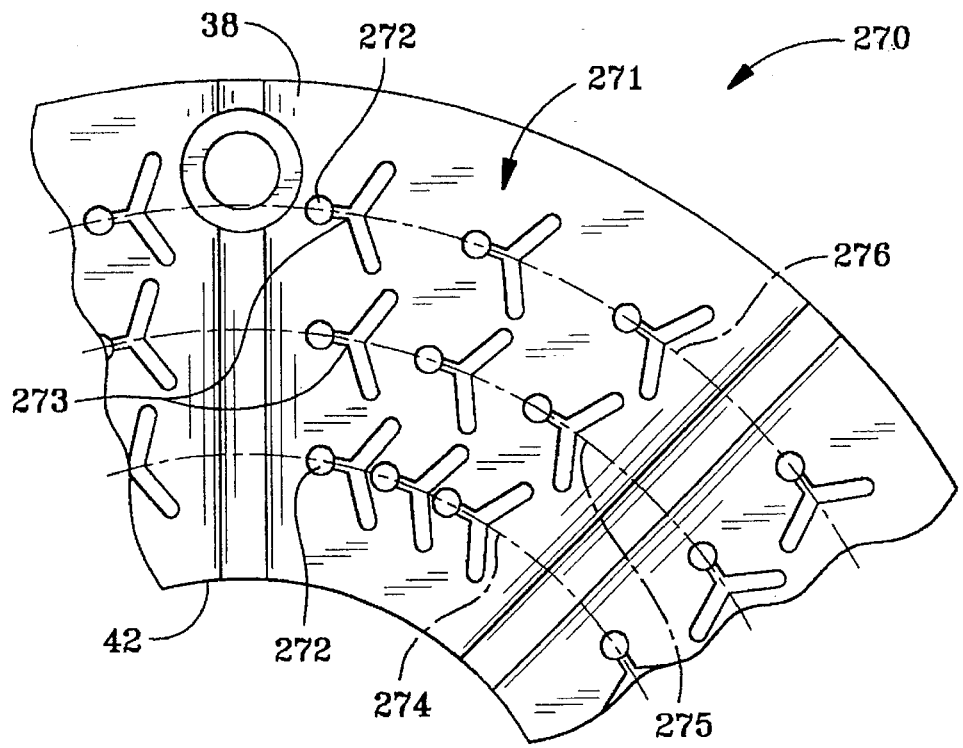
FIG. 16 is an enlarged view of a portion of the bearing side of a sixth embodiment thrust bearing plate showing a bearing pad and lubricant distribution recess.
Figure 17:
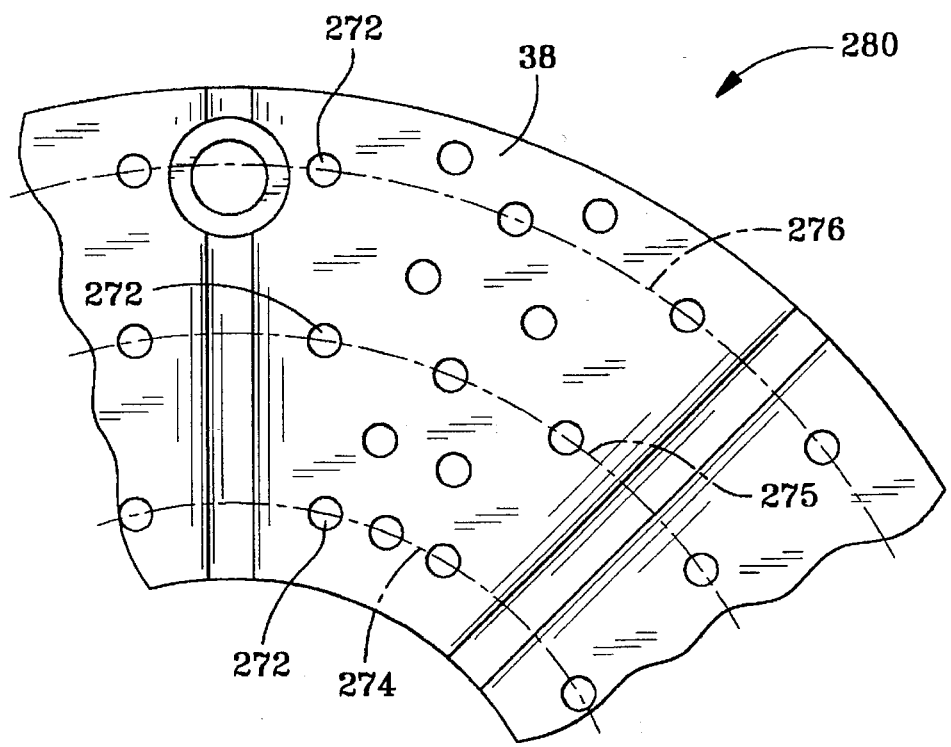
FIG. 17 is an enlarged view of a portion of the bearing side of a seventh embodiment thrust bearing plate showing a bearing pad and lubricant distribution recess.

FIGS. 16 and 17 respectively disclose sixth and seventh preferred embodiments of the thrust bearing plate of the present invention. In both embodiments, the distribution means formed along the bearing plate bearing pad 38 includes a plurality of distribution recesses organized in clusters, each cluster oriented along an arcuate curve. For example, in the sixth embodiment thrust bearing plate 270 includes distribution means 271 that is comprised of cylindrical passages 272 that extend through the thrust bearing plate, and dendritic distribution grooves 273 that extend a distance below the bearing surface of the pad in lubricant receiving relation with each passage. The passages flow connect the supply recess 138 formed on the supply side of the thrust bearing plate with the bearing side. As shown in FIG. 16, the passage/dendritic groove combinations are arranged in clusters of three each cluster arranged along an arcuate segment identified in the figure as inner segment 274, middle segment 275 or outer segment 276. For each passage/dendritic groove combination, the passage is located nearer the radial edge 37 and the dendritic groove is located nearer second radial edge 39. However it is contemplated that this orientation may be altered so that for each combination, the passages 272 are nearer second edge 39 and the dendritic grooves 273 are nearer first edge 37.

In seventh embodiment thrust bearing plate 280, only passages 272 are located in clusters like the clusters of the sixth embodiment thrust bearing plate 270. The dendritic grooves are not provided in combination with the passages. The passages are organized in clusters along arcuate curves 274, 275, and 276. Supply recess 138 is formed along the supply side of the thrust bearing plate.

In both the sixth and seventh embodiments, openings may be provided in the spaces between the arrays in order to maximize the distribution of fluid to the bearing pad. The passages may be the same size as the passages which comprise the clusters or may be a different size.

In both the sixth and seventh embodiments, three clusters with three distribution recesses are disclosed. However, it should be understood that any suitable number of clusters including any suitable number of distribution recesses may be provided.

Figure 18:
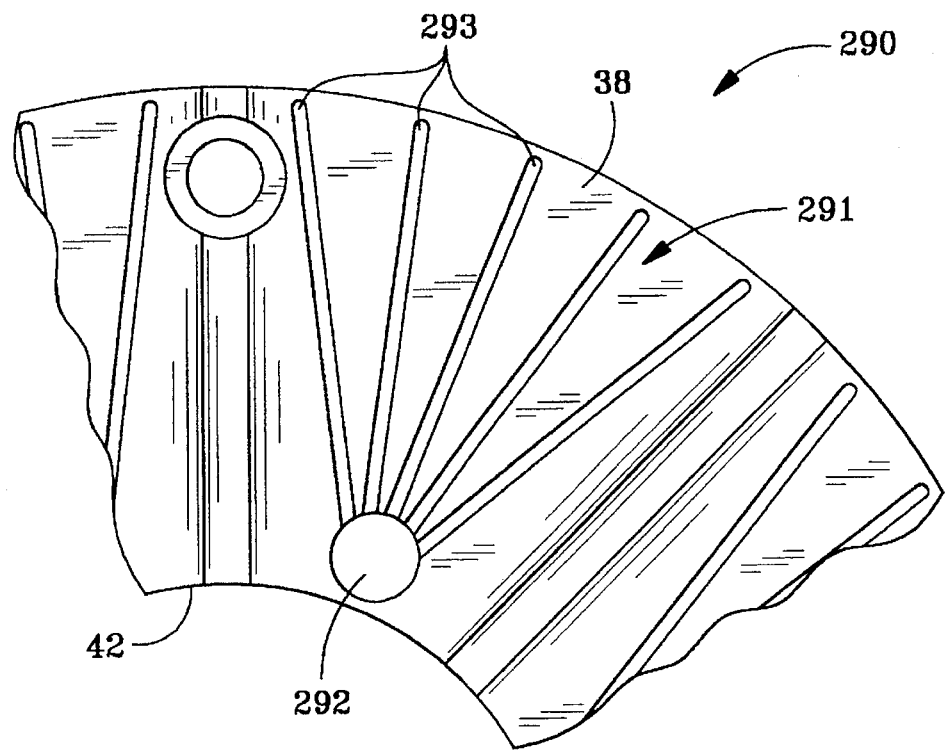
FIG. 18 is an enlarged view of a portion of the bearing side of an eighth embodiment thrust bearing plate showing a bearing pad and lubricant distribution recess.

FIG. 18 discloses an eighth preferred embodiment of the thrust bearing plate of the present invention. The eighth embodiment thrust bearing plate 290 includes a lubricant distribution means 291 comprised of a cylindrical passageway 292 and a plurality of distribution grooves 293, that are in lubricant receiving communication relative to passage 292 an extend away from the passage in a fan-like pattern. The passage extends through the bearing pad 38 and is located adjacent central bore 42. The grooves extend away from the passage and are closed at a position near the outer periphery of the thrust bearing plate. Supply recess 138 is formed along the supply side of the thrust bearing plate.

As shown in FIG. 18, five discrete grooves are provided however any number of grooves may be provided.

Figure 19:
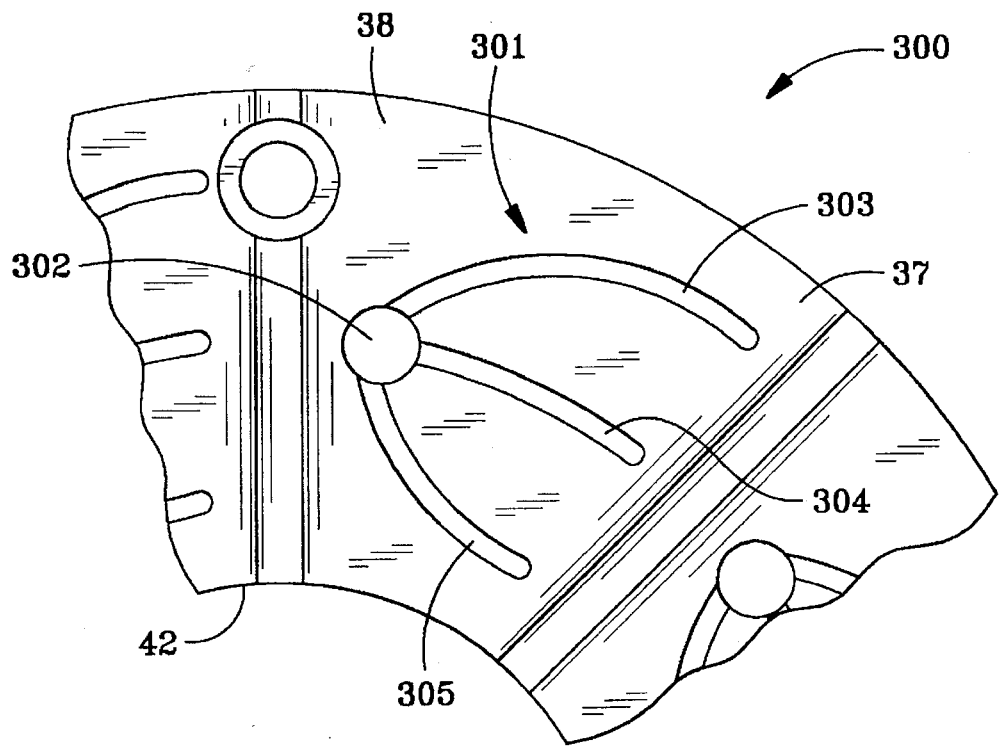
FIG. 19 is an enlarged view of a portion of the bearing side of a ninth embodiment thrust bearing plate showing a bearing pad and lubricant distribution recess.

A ninth preferred embodiment of the thrust bearing plate of the present invention is shown in FIG. 19. The thrust bearing plate 300 includes a lubricant distribution means 301 formed along bearing pad 38. The distribution means includes lubricant passage 302 like lubricant passages 292 disclosed hereinabove. The lubricant passage is located adjacent channel 40.

Three distribution grooves 303, 304 and 305 are located in lubricant receiving relation with passage 302. The grooves are each substantially arcuate but do not share the same center. As shown in FIG. 19, groove 305 has a positive curvature and grooves 303 and 304 have negative curvature. The grooves may extend into the pad approximately halfway between the sides of the bearing plate 300.

In the ninth preferred embodiment three grooves are disclosed however, any number of grooves may be provided. The grooves extend away from passage 302, and terminate at a location adjacent second peripheral edge 37. It should be understood that passage 302 could be located adjacent second radial edge 39 and grooves could terminate at a position proximate first radial edge 37.

While I have illustrated and described preferred embodiments of my invention, it is understood that these are capable of modification, and I therefore do not wish to be limited to the precise details set forth, but desire to avail myself of such changes and alterations as fall within the purview of the following claims.

Having described the invention, what is claimed is:

1. In a rotary screw compressor having a compressor housing with an inlet for flowing a gas to the compressor, a discharge port for flowing compressed gas and a lubricant from the compressor; a first rotor mounted on a first shaft; a second rotor mounted on a second shaft, said rotors and shafts being enclosed by the compressor housing; a first thrust bearing located along the first shaft; and a second thrust bearing located along the second shaft; a separator means for separating the lubricant and compressed gas said separator means having a sump portion and a sump discharge port, an apparatus for supplying the lubricant to the thrust bearings and compressor rotors, the apparatus comprising:

a) first valve for controlling flow of lubricant to the apparatus;

b) second valve connected to the discharge port of the sump of the separator means the second valve means for supplying lubricant from the sump to the rotors;

c) temperature sensing means for sensing the temperature of the lubricant supplied to the rotors;

d) pressure sensing means for measuring the pressure of the compressed gas discharged from the compressor;

e) speed sensing means for detecting the operating speed of the rotors;

f) electronic control means responsive to signals received from the temperature sensing means, the pressure sensing means and the speed sensing means for selectively opening and closing the second valve to optimize the volume of lubricant supplied to the compressor rotors, said control means also for controlling the first valve for controlling the flow of lubricant to the thrust bearings;

g) pressure regulator means for controlling the supply of lubricant to the thrust bearings in response to input signals received from the electronic control means, said pressure regulator being flow connected to each thrust bearing by an independent lubricant supply line to thereby alter the pressure of each thrust bearing independent of the other thrust bearing.

2. The apparatus as claimed in claim 1 wherein the electronic control means is a microprocessor.

3. The apparatus as claimed in claim 1, further comprising a second temperature sensing means connected to the electronic control means in signal transmitting relation therewith, said second temperature sensing means for measuring ambient temperature.

4. The apparatus as claimed in claim 1 further comprising a lubricant filter means for filtering the lubricant supplied to the thrust bearings and compressor rotors, a first lubricant pressure sensing means located upstream from the filter to measure the pressure of the unfiltered lubricant, second lubricant pressure sensing means located downstream from the lubricant, said second sensing means for measuring the pressure of the filtered lubricant.

5. The apparatus as claimed in claim 1 wherein the lubricant is water.

6. The apparatus as claimed in claim 1 further comprising a first lubricant level sensing means for measuring a maximum lubricant level in the separator means, a second lubricant level sensing means for measuring a minimum lubricant level in the separator means, the lubricant level sensing means being connected with the electronic control means in signal transmitting relation with the control means.

7. The apparatus as claimed in claim 6, further including a third valve opened in by the control means in response to a signal from the minimum level sensor indicating a lubricant level below a predetermined minimum, and a fourth means opened by the control means in response to a signal from the maximum level sensor indicating a lubricant level above a predetermined maximum.

8. The apparatus as claimed in claim 1, wherein the compressor housing is adapted to collect used lubricant at a first housing portion, said apparatus further comprising a fifth valve flow connected with the compressor housing at the housing portion, said fifth valve opened in response to signal received from the electronic control means to thereby flow collected lubricant from the compressor housing.

9. In a compressor having a first rotary element mounted on a first shaft, a second rotary element mounted on a second shaft, thrust bearing mounted on each shaft to counteract thrust loads in the compressor, where the thrust bearing includes a unitary thrust bearing plate which has a lubricant supply side, a bearing side, at least one bearing bearing pad along the bearing side with a lubricant distribution recess formed on each of the at least one bearing pads, at least one lubricant distribution recess on the supply side of the thrust bearing plate and lubricant flow passages flow connecting associated lubricant supply and distribution recesses, the method comprising the steps of:

sensing the ambient temperature;

sensing the rotational velocity of the first rotary element;

transmitting signals representing the sensed ambient temperature value and sensed rotational velocity to a microprocessor based controller;

controlling a pressure regulator that is flow connected to the thrust bearings by separate flowlines for each bearing in response to the sensed temperature and rotational velocity, to thereby effect the volume of lubricant that is supplied to the thrust bearings; and flowing a lubricant to the supply side of the thrust bearing plate, through the passages and onto the bearing surface to form a lubricant film on each of the at least one bearing pads.

10. The method of claim 9 wherein the compressor is driven by a prime mover that is electrically connected to a controller, the method comprising the additional step of starting the prime mover by intermittently supplying power to a motor.

11. The method of claim 9 wherein the pressure regulator supplies different volume of lubricant to each bearing.

12. The method as claimed in claim 9 including the additional step of flowing pressurized air from a separator means through the compressor bearings if the temperature sensing means senses a temperature below a predetermined temperature.

13. The method of claim 9 wherein the compressor includes a housing, the method comprising the step of collecting the lubricant in the compressor housing and flowing the collected lubricant from the housing.

14. The method as claimed in claim 9 comprising the step of flooding the bearings with lubricant before starting the compressor.

15. The method as claimed in claim 9 wherein a mixture of compressed air and lubricant is flowed from the compressor to a separator having a main inlet, a lubricant flow inlet and a discharge port, said separator also including a maximum level sensor, and a minimum level sensor, said method comprising the following additional step:

flowing an additional volume of lubricant to the separator through the lubricant flow inlet if the low level sensor senses a lubricant level below a predetermined minimum.

16. The method of claim 15 including the additional step of: flowing lubricant out of the separator discharge if the maximum level sensor senses a lubricant level above a predetermined maximum level.

17. The method as claimed in claim 9 including the additional step of supplying lubricant under a first pressure to one thrust bearing.

18. The method as claimed in claim 17 including the additional step of supplying lubricant under a second pressure to one of the other thrust bearing.

19. The method as claimed in claim 9 wherein each thrust bearing plate has a central opening, the method including the additional step of supplying lubricant to the central opening of each thrust bearing plate.

* * * * *